United States Patent [19]
Sato et al.

[11] Patent Number: 5,889,218
[45] Date of Patent: Mar. 30, 1999

[54] APPARATUS AND METHOD FOR INSPECTING A BALL BEARING

[75] Inventors: Chuichi Sato; Hiroyuki Matsuzaki, both of Kanagawa, Japan

[73] Assignee: NSK Ltd., Tokyo, Japan

[21] Appl. No.: 971,293

[22] Filed: Nov. 17, 1997

[30] Foreign Application Priority Data

Nov. 15, 1996 [JP] Japan .................................... 8-318621

[51] Int. Cl.[6] .................................................. G01M 19/00
[52] U.S. Cl. ............................................ 73/865.8; 73/593
[58] Field of Search .................................. 73/865.8, 593, 73/788, 862.49

[56] References Cited

U.S. PATENT DOCUMENTS

| | | | |
|---|---|---|---|
| 4,551,677 | 11/1985 | Bankston | 73/37.5 |
| 4,729,239 | 3/1988 | Gordon | 73/593 |
| 5,565,623 | 10/1996 | Philpott et al. | 73/7 |

FOREIGN PATENT DOCUMENTS

| | | | |
|---|---|---|---|
| 1 523 369 | 8/1975 | United Kingdom | G01M 13/04 |
| 2 288 211 | 10/1995 | United Kingdom | G01M 13/04 |

*Primary Examiner*—Max H. Noori
*Attorney, Agent, or Firm*—Sughrue, Mion, Zinn, Macpeak & Seas, PLLC

[57] ABSTRACT

In the ball bearing inspection apparatus and method, the butting portion 7c of a skew drive shaft 7 rotatable coaxially with a spindle rotary shaft 1 is butted against steel balls 3 which are respectively held between the respective grooves of the inner ring 4b and outer ring 4a of a ball bearing 4 to be inspected, the spindle rotary shaft 1 is rotated while applying a pre-load to the outer ring 4a by a pre-load ring 5, and the skew drive shaft 7 is rotated while controlling the rotation speed of the skew drive shaft 7 in such a manner that the respective steel balls 3, which are being rotated on their own axes and around the spindle rotary shaft 1 due to the rotation of the spindle rotary shaft 1, is caused to make a skew movement due to the butting portion 7c. Therefore, physical quantities such as vibrations, sound pressures and the like generated from the ball bearing 4 to be inspected are measured in a condition that the respective balls 3 are making their respective skew movements in addition to their rotational movements on their own axes and around the spindle rotary shaft 1.

5 Claims, 4 Drawing Sheets

APPARATUS AND METHOD FOR INSPECTING A BALL BEARING

BACKGROUND OF THE INVENTION

The present invention relates to an apparatus and method for inspecting a ball bearing, with a pre-load being applied to the ball bearing to be inspected in the axial direction thereof, physical quantities such as vibrations, sound pressures and the like which are generated from the ball bearing to be inspected due to the relative rotation between the inner and outer rings of the ball bearing are measured, and the ball bearing is inspected based on the results of such measurement.

Generally, a ball bearing consists mainly of an inner ring which includes a groove, as a raceway, formed on its outer peripheral surface and is to be fixed to the rotary shaft of a rotatable mechanical part, an outer ring which includes a groove, as a raceway, formed on its inner peripheral surface and is to be fixed to a bearing portion, and a plurality of steel balls or balls formed of ceramics or the like (description will be given hereinafter of the steel balls as the representative thereof) which are inserted between the respective grooves of the inner and outer rings. After the ball bearing is assembled, the ball bearing is usually delivered to an inspection process in which the ball bearing is synthetically inspected for the quality thereof. In this inspection process, the ball bearing is inspected according to a method in which the inner ring of a ball bearing to be inspected is mounted on a reference rotary shaft rotatable on its own axis, with a pre-load being applied to the outer ring of the ball bearing to be inspected in the axial direction thereof, the reference rotary shaft is rotated to thereby rotate the inner ring relative to the outer ring, physical quantities such as vibrations, sound pressures and the like which are generated from the ball bearing to be inspected due to the relative rotation between the inner and outer rings are measured, and the ball bearing is inspected for the quality thereof on the basis of the results of such measurement.

Next, description will be given below in detail of the above-mentioned inspection method and a ball bearing inspection unit used to enforce the inspection method with reference to FIGS. 1 and 2. Here, FIG. 1 is a structure view of the main portions of a conventional ball bearing inspection unit, and FIG. 2 is a typical view of a ball bearing which is inspected by the inspection unit shown in FIG. 1, showing how each of the steel balls of the ball bearing rolled around its own axis and revolves around the reference rotary shaft.

A conventional ball bearing inspection unit, as shown in FIG. 1, comprises a bed 50 on which there are carried bearing rotating member 60 used to rotate the inner ring 4b of a ball bearing 4 to be inspected, and pre-load applying member 70 for applying a pre-load to the outer ring 4a of the ball bearing 4 to be inspected.

As shown in FIG. 1, the bearing rotating member 60 comprises a spindle 30, while the spindle 30 includes a spindle rotary shaft 1 which is supported by a plurality of radial bearings 31 and a plurality of thrust bearings 32 (which are both air hydrostatic bearings). The spindle rotary shaft 1 includes one end 1a which is structured such that the inner ring 4b of the ball bearing 4 to be inspected can be mounted on it, while a pulley 36 is mounted on the other end 1b of the spindle rotary shaft 1. The spindle rotary shaft 1 can be rotated by a drive force given by a rotation drive motor 34, while the drive force of the rotation drive motor 34 is transmitted to the spindle rotary shaft 1 through a pulley 38 mounted on the output shaft of the rotation drive motor 34 which is mounted on the bed 50 and through an endless belt 37 which is disposed and put over the two pulleys 38 and 36.

On the other hand, as shown in FIG. 1 the pre-load applying member 70 comprises a pre-load slider 23 which is movable on the bed 50 along the axial direction of the spindle rotary shaft 1, while a nut 24a is fixedly secured to the pre-load slider 23. The nut 24a is brought in threaded engagement with a male screw 25 which is supported by a male screw support portion 26 mounted on the bed 50 in such a manner that the male screw 25 is rotatable around its own axis. The male screw 25 can be rotated by a pre-load drive motor 27. When the male screw 25 is rotated, the pre-load slider 23 is moved along the axial direction of the spindle rotary shaft 1. To the surface of the pre-load slider 23 that is opposed to the spindle rotary shaft 1, there is fixed one end 6a of a pre-load spring 6 serving as an elastic member, whereas a pre-load ring 22 is mounted on the other end 6b of the pre-load spring 6. The pre-load ring 22, due to the movement of the pre-load slider 23, is butted against the outer ring 4a of the ball bearing 4 to be inspected against the spring force of the pre-load spring 6, while a pre-load to be applied to the outer ring 4a of the ball bearing 4 to be inspected is determined in accordance with the moving position of the pre-load slider 23 and the spring constant of the pre-load spring 6.

When measuring vibrations generated from the ball bearing 4 to be inspected during the rotation of the ball bearing 4 to be inspected, that is, while the inner ring 4b is rotating relatively to the outer ring 4a, there is used a vibration measuring device consisting of a converter 40 or the like which is to be contacted directly with the outer ring 4a; and, the thus generated vibrations are converted into electrical signals by the converter 40, and the thus converted electrical signals are then input to a measuring device main body (not shown). The relative positioning between the converter 40 and outer ring 4a is achieved by adjusting the position of the converter 40 by a converter position adjust slider 41. Also, when measuring sound pressures generated from the ball bearing 4 to be inspected, there is used a sound pressure measuring device consisting of a microphone 42 or the like which is held at a predetermined interval from the ball bearing 4 to be inspected.

Next, description will be given below of an inspection procedure using the above-mentioned conventional inspection unit.

At first, the inner ring 4b of the ball bearing 4 to be inspected is mounted onto one end of the spindle rotary shaft 1. Next, the pre-load slider 23 is moved to a predetermined position to thereby cause the pre-load ring 22 to butt against the outer ring 4a of the ball bearing 4 to be inspected, so that a predetermined pre-load is applied to the outer ring 4a in the axial direction thereof.

Next, if the predetermined pre-load is applied to the outer ring 4a, then the spindle rotary shaft 1 is rotated by the rotation drive motor 34 and the inner ring 4b is thereby rotated with respect to the outer ring 4a. As shown in FIG. 2, as a result of such relative rotation of the inner ring 4b, due to the pre-load applied to the outer ring 4a, each of the steel balls 3 held between the respective grooves of the inner and outer rings 4b and 4a is in contact with the respective grooves of the inner and outer rings 4b and 4a at contact points $A_o$ and $A_i$ in such a manner that it forms a contact angle $\alpha$ with them. Namely, each of the steel ball 3 is rotated around about its own axis B, as an autorotation axis, intersecting at right angles to a straight line connecting its own contact points $A_o$ and $A_i$ and revolved around the axis of the spindle rotary shaft 1.

The vibrations or sound pressures that are generated from the ball bearing 4 to be inspected in the above-mentioned rotating condition are measured and, based on the measurement results, the ball bearing 4 to be inspected is inspected for its quality.

However, in the above-mentioned conventional inspection method, since each steel ball 3 is caused to rotate on the axis B as its rotation axis due to the pre-load applied to the outer ring 4a in such a manner that it forms the contact angle $\alpha$ with the respective grooves of the inner and outer rings 4b and 4a while it is in contact with them at the contact points $A_o$ and $A_i$, the contact areas of the steel ball 3 with respect to the respective grooves of the inner and outer rings 4b and 4a are confined to the slight width areas each including therein a large circle corresponding to the equator with the axis B as a line connecting the south and north poles, with the result that there can be obtained only the measurement results covering several percent of surface area out of the whole surface area of each steel ball 3. Therefore, the finishing precision of the steel ball 3 and the presence or absence of damage on the surface of the steel ball 3 cannot be inspected over the whole area of the steel ball 3, that is, it is difficult to inspect the ball bearing 4 to be inspected with such a high inspection precision that can provide a sufficient guarantee for the quality of the ball bearing 4 to be inspected.

SUMMARY OF THE INVENTION

The present invention aims at eliminating the drawbacks found in the above-mentioned conventional ball bearing inspection method. Accordingly, it is an object of the invention to provide an apparatus and method for inspecting a ball bearing which can improve remarkably an inspection precision to thereby provide a sufficient quality guarantee for a ball bearing to be inspected.

In attaining the object, according to the invention, there is provided an inspection method for inspecting a ball bearing, in which the inner ring of a ball bearing to be inspected is mounted onto a reference rotary shaft rotatable on its own axis, while applying a pre-load to the outer ring of the ball bearing to be inspected in the axial direction thereof, the reference rotary shaft is rotated to thereby rotate the inner ring with respect to the outer ring, physical quantities such as vibrations, sound pressures and the like generated from the ball bearing to be inspected due to the relative rotation between the inner and outer rings are measured, and the ball bearing to be inspected is inspected in accordance with the measurement results, the inspection method characterized in that a butting portion formed in a rotary member rotatable coaxially with the reference rotary shaft is butted against steel balls which are respectively held between the respective grooves of the inner and outer rings, the reference rotary shaft is rotated while applying the above-mentioned pre-load to the outer ring, the rotary member is rotated while controlling or varying the rotation speed of the rotary member in such a manner that the respective steel balls are caused to make their respective skew movements, and the physical quantities generated from the ball bearing to be inspected are measured in a condition that the respective steel balls are making their respective skew movements.

In addition, in attaining the object, according to the invention, there is also provided an inspection method for inspecting a ball bearing having an inner ring, an outer ring, and a plurality of rolling elements rotatably interposed between the inner ring and the outer ring, the inspection method comprising the steps of;

mounting the inner ring onto a reference rotary shaft rotatable on its own axis;

rotating the reference rotary shaft onto which the inner ring is thus mounted so as to rotate the inner ring relative to the outer ring and in turn rotate the rolling elements about its own axis and revolve the rolling elements about the rotating axis of the reference rotary shaft, while applying a pre-load to the outer ring in the axial direction thereof;

butting a butting portion formed in a rotary member which is rotatable coaxially with the reference rotary shaft against the rolling elements;

rotating the rotary member the butting portion of which is thus butt against the rolling elements so as to give the rolling elements skew movements respectively while controlling a rotation speed of the rotary member to be varied cyclically; and measuring physical quantities of the ball bearing generated from the ball bearing.

In the above-mentioned inspection method, the reference rotary shaft rotating step, the rotary member rotating step, the physical quantities measuring step may be simultaneously conducted.

In the above-mentioned inspection method, the rotation speed of the rotary member may be controlled to be varied cyclically in a sine wave.

Further, in the above-mentioned inspection method, the cycle of the variation of the rotation speed of the rotary member is preferably set slightly larger or smaller than the cycle of the rotation of the rolling element about its own axis caused by the rotation of the reference rotary shaft.

Furthermore, in the above-mentioned inspection method, a ratio of the cycle of the variation of the rotation speed of the rotary member and the cycle of the rotation of the rolling element is preferably set not to be an integral number.

Moreover, in the above-mentioned inspection method, the butting portion is butted against all the rolling elements at the same time.

In addition, in attaining the object, according to the invention, there is provided an apparatus for inspecting a ball bearing having an inner ring, an outer ring, and a plurality of rolling elements rotatably interposed between the inner ring and the outer ring, the apparatus comprising:

a reference rotary shaft rotatable on its own axis, the inner ring being mounted on the reference rotary shaft;

a bearing rotating member for rotating the reference rotary shaft so as to rotate the inner ring relative to the outer ring and in turn rotate the rolling elements about its own axis and revolve the rolling elements about the rotating axis of the reference rotary shaft;

a pre-load applying member for applying a pre-load to the outer ring in the axial direction thereof;

a butting member for butting a butting portion formed in a rotary member which is rotatable coaxially with the reference rotary shaft against the rolling elements;

a skew controlling member for rotating the rotary member the butting portion of which is butted against the rolling elements so as to give the rolling elements skew movements respectively while controlling a rotation speed of the rotary member to be varied cyclically; and a measuring member for measuring physical quantities of the ball bearing generated from the ball bearing.

In the ball bearing inspection apparatus and method, not only while the reference rotary shaft is rotated to thereby cause the respective steel balls to make their respective rolling movements but also while the butting portion of the rotary member is butted against the respective steel balls from the lateral side thereof, the rotary member is rotated while controlling the same in such a manner that the rotation speed thereof can be made to vary. In this case, the rotation of each steel ball about its own axis is a composite of two components; in particular, one component is the rotation thereof about its own axis due to the rotation of the reference rotary shaft, and the other is the rotation thereof on its own axis that is caused to occur because the rotation of the rotary member is transmitted to the steel ball through the butting portion, that is, a component consisting of the rotation thereof on an axis which not only extends perpendicularly to the rotation axis of the reference rotary shaft but also passes a point on the present rotation axis and the center of the steel ball. Therefore, since the rotary member is controlled in such a manner that the rotation speed thereof can be made to vary, the axis on which each steel ball is rotated is also caused to vary in position. That is, the steel ball rotation axis is caused to make a skew movement.

In other words, because the steel ball rotation axis is caused to make a skew movement in such a direct manner that, while the butting portion is butted against the steel ball, the rotary member is rotated, it is absolutely certain that each steel ball can be made to make a skew movement.

Also, since the butting portion is butted against all the steel balls at the same time, all the steel balls can be surely made to make their respective skew movements at the same time.

Further, by controlling the skew movements of the steel balls, the loci of the contact points of the steel balls with respect to the inner and outer rings can be shifted gradually on the surfaces of the steel balls. According to the ball bearing inspection method, the points on the surfaces of the steel balls, which are present over a remarkably wider area than that of the conventional ball bearing inspection method in which the loci of the contact points are limited to a slight width area, are able to come into contact with the inner and outer rings in a short time.

In this manner, since the physical quantities generated from the ball bearing to be inspected are measured during the skew movements of the steel balls, such measurement results contain therein the measurement results covering almost the whole area of the steel ball surface with respect to the respective grooves of the inner and outer rings. Therefore, with use of such measurement results, the steel balls can be inspected for the finishing precision thereof as well as for the presence or absence of damage on the surface thereof over the whole surface area of the steel balls.

In particular, if the rotation speed variation to be given to the rotary member is controlled in such a manner that it varies cyclically in a sine wave or the like and the cycle of the speed variation is set slightly larger or smaller than the cycle of the rotation of the steel ball on its own axis caused by the rotation of the reference rotary shaft, then the contact points of each steel ball with respect to the inner and outer rings respectively draw loci which are shifted gradually and regularly. That is, since the measurements are made while the respective steel balls are making such skew movements, almost the whole surface of the steel balls can be made to come into contact with the inner and outer rings uniformly and positively, which makes it possible to obtain a further higher reliable inspection result in a short time.

DETAILED DESCRIPTION OF THE PREFERRED EMBODIMENTS

Now, description will be given below of preferred embodiments of a ball bearing inspection apparatus and method according to the invention with reference to the accompanying drawings.

Figure 3:
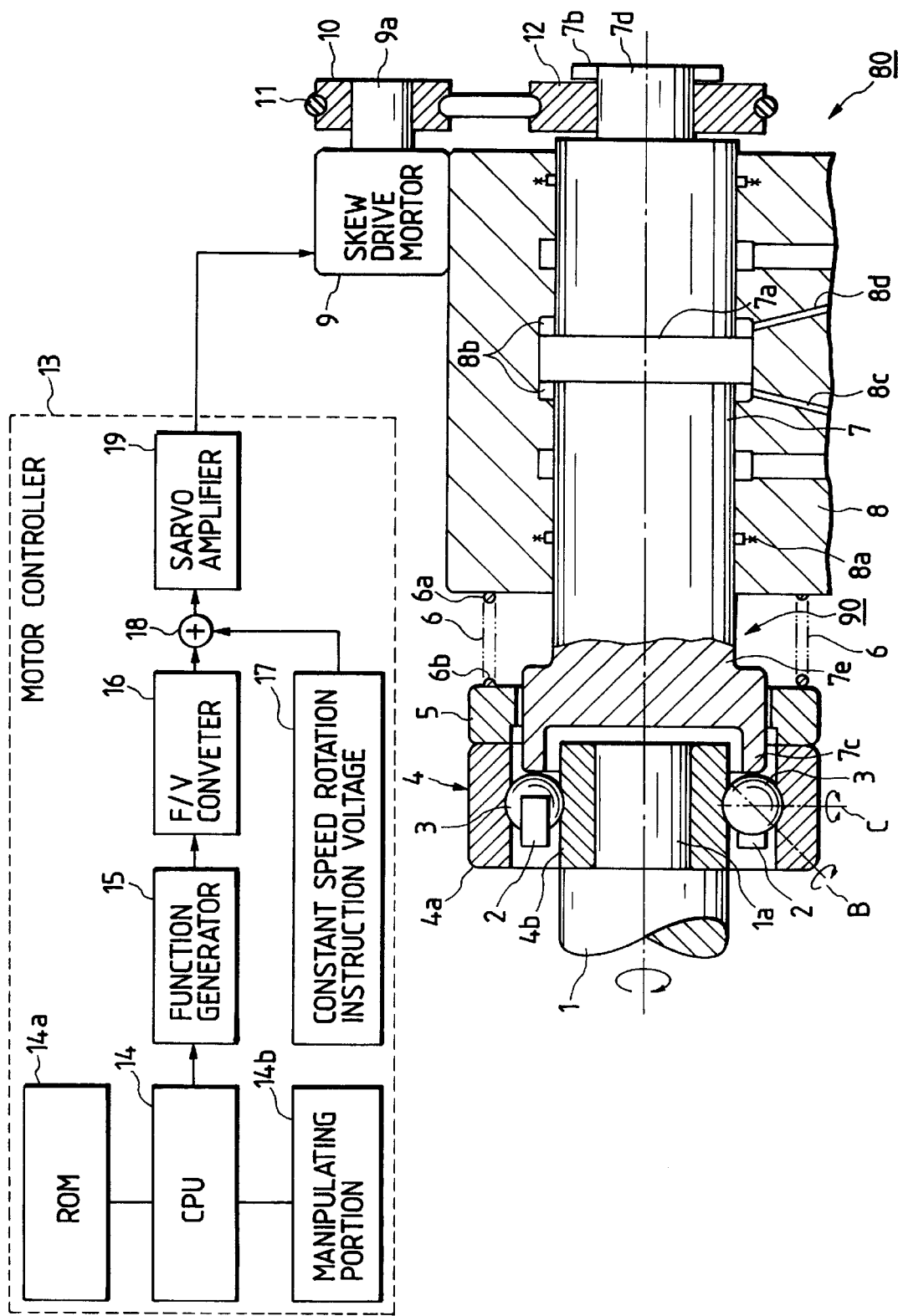
FIG. 3 is a structure view of the main portions of an inspection unit used in a first embodiment of a ball bearing inspection method according to the invention.

FIG. 3 is a structure view of the main portions of an inspection unit which is used in a first embodiment of a ball bearing inspection method according to the invention.

The ball bearing inspection unit, as shown in FIG. 3, comprises bearing rotating member 60 which is used to rotate an inner ring 4b of a ball bearing 4 to be inspected, pre-load applying member 80 used to apply a pre-load to an outer ring 4a of the ball bearing 4 to be inspected, and skew drive member 90 for driving a plurality of steel balls 3 to make their respective skew movements, while the steel balls 3 are respectively interposed between the respective grooves of the inner and outer rings 4b and 4a, and the bearing rotating member 60, pre-load applying member 80 and skew drive member 90 are respectively carried on a bed (not shown).

Description given hereinafter is an example of the present invention in which the ball bearing 4 to be inspected is of a type that the steel balls 3 are held by retainers 2 respectively.

Figure 1:
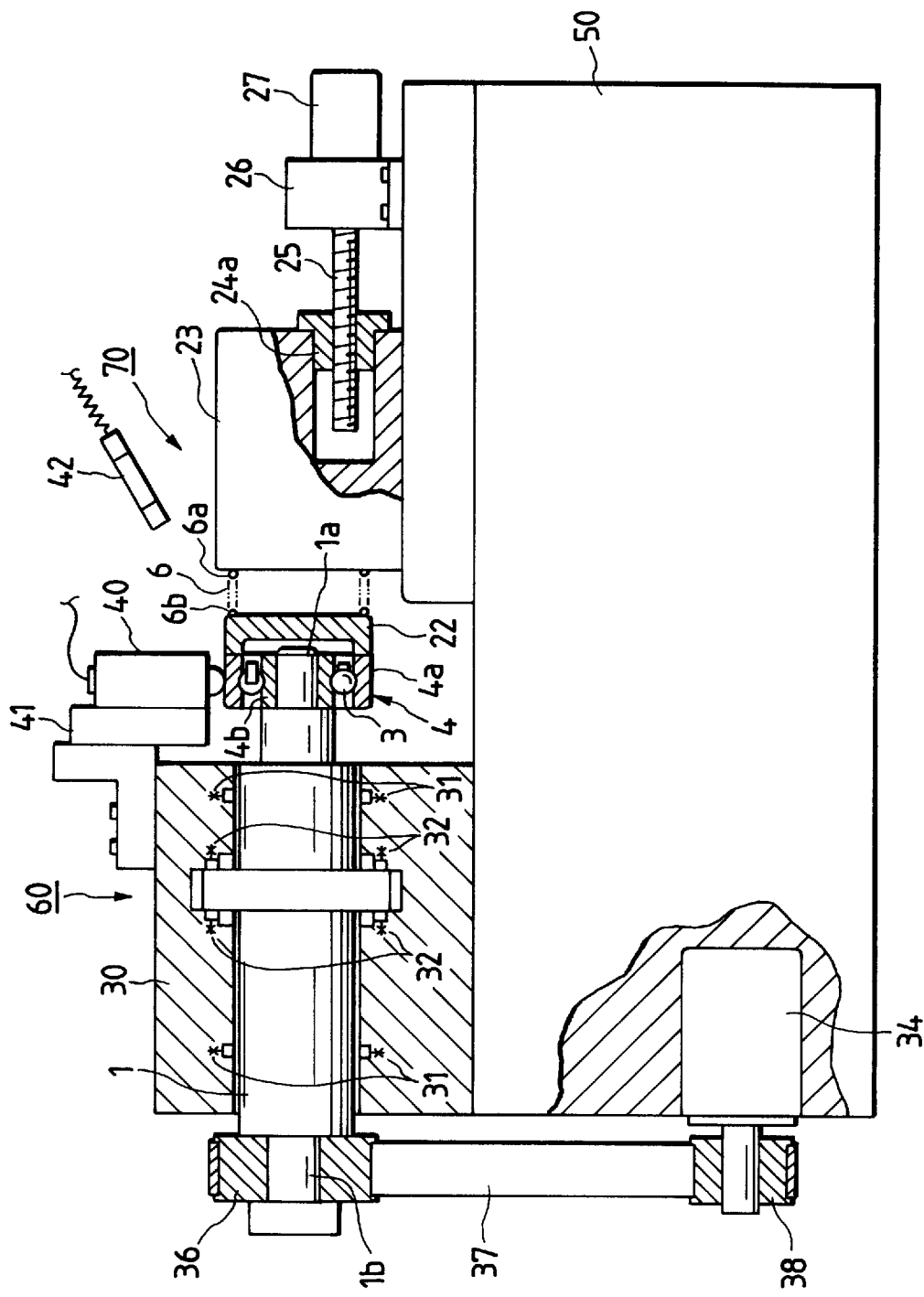
FIG. 1 is a structure view of the main portions of a conventional ball bearing inspection unit.
Figure 2:
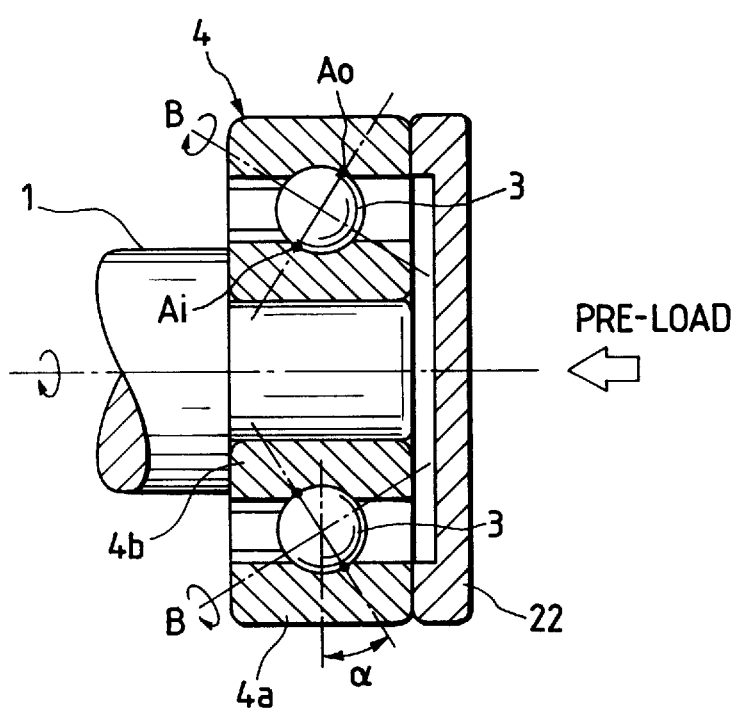
FIG. 2 is a typical view of the conditions of the rotational movements of steel balls on their own axes and around a reference rotary shaft, the steel balls respectively included in a ball bearing which is being inspected by the inspection unit shown in FIG. 1.

The bearing rotating member 60 is similar in structure to the bearing rotating member 60 of the ball bearing inspection unit shown in FIG. 1, in which a spindle rotary shaft 1 can be rotated by a drive force to be transmitted thereto from a rotation drive motor through pulleys and a belt, the inner ring 4b of the ball bearing 4 to be inspected is mounted on one end 1a of the spindle rotary shaft 1.

Also, the pre-load apply member 80 includes a pre-load slider 8 which can be moved on the bed along the axial direction of the spindle rotary shaft 1. In particular, to move the pre-load slider 8 along the axial direction of the spindle rotary shaft 1, a male screw in threaded engagement with a nut fixed to the pre-load slider 8 may be rotated by a pre-load drive motor. To the surface of the pre-load slider 8 that faces the spindle rotary shaft 1, there is fixed one end 6a of a pre-load spring 6 serving as an elastic member, while a pre-load ring 5 is mounted on the other end 6b of the pre-load spring 6. By the way, as the elastic member, besides the pre-load spring 6 shown in FIG. 3, there can be used an annular member formed of hard rubber or the like structured such that the two ends thereof are respectively fixed to the pre-load slider 23 and pre-load ring 22, or a structure in which a plurality of springs are respectively held between the mutually opposing surfaces of the pre-load slider 23 and pre-load ring 22. The pre-load ring 5, due to the movement of the pre-load slider 8, is butted against the outer ring 4a of the ball bearing 4 to be inspected against the spring force of the pre-load spring 6, while a pre-load to be applied to the outer ring 4a of the ball bearing 4 to be inspected is determined in accordance with the moving position of the pre-load slider 8 as well as the spring constant of the pre-load spring 6.

Further, as shown in FIG. 3 the skew drive member 90 includes a skew drive shaft 7 which not only extends coaxially with the spindle rotary shaft 1 but also extends through the interior portion of the pre-load slider 8. One end 7e of the skew drive shaft 7 projects toward the spindle rotary shaft 1 from the pre-load slider 8 and, in the one end, there is formed a butting portion 7c which can be butted against the respective steel balls 3. By the way, the butting portion 7c must be structured such that it can never damage the steel balls 3. Also, in order to avoid a possibility that dust can enter the interior portion of the bearing due to generation of abrasion powder, the butting portion 7c may be formed of resin such as Teflon, nylon or the like. The other end 7d of the skew drive shaft 7 projects from the pre-load slider 8 in the opposite direction to the spindle rotary shaft 1 and, in the other end, there is mounted a pulley 12 by a lock nut 7b. The skew drive shaft 7 includes in the intermediate portion thereof a flange portion 7a which is stored in a cylinder 8b formed in the interior portion of the pre-load slider 8. The flange portion 7a operates as a piston with respect to the cylinder 8b. Also, the flange portion 7a cooperates together with the cylinder 8b in forming a piston/cylinder mechanism which can move the flange portion 7a by pressurized air to be supplied to the cylinder 8b from an air pressure circuit (not shown) through an air flow passage 8c or 8d.

The skew drive shaft 7 is supported in such a manner that it can be rotated and reciprocated by an air bearing 8a (hydrostatic radial bearing) provided in the interior portion of the pre-load slider 8. The air bearing 8a is composed of an air entrance and a plurality of air escape grooves. The skew drive shaft 7 can be rotated by a drive force which is transmitted from a skew drive motor 9 to the pulley mounted on the other end 7d of the skew drive shaft 7 through a belt 11. On the output shaft 9a of the skew drive motor 9, there is mounted a pulley 10 over which the belt 11 is provided. The skew drive motor 9 is driven and controlled by a motor controller 13. In particular, the motor controller 13 drives and controls the skew drive motor 9 while controlling the rotation speed of the skew drive shaft 7, that is, the rotation speed of the skew drive motor 9 in such a manner the steel balls 3 are caused to make their respective skew movements due to their contact with the butting portion 7c of the skew drive shaft 7. In the rotation speed control, in particular, the skew drive motor 9 is driven and controlled in such a manner that the rotation speed of the skew drive motor 9 can coincide with a speed obtained by superimposing a variable speed component, which varies in a wave form expressed by a sine function, on a constant rotation speed component (for example, a speed equal to the speed of the orbital rotation of the steel ball 3, that is, the speed of the rotation of the steel ball 3 around the spindle rotary shaft 1). Here, the cycle of the variable speed component is set slightly larger or smaller than the cycle of the rotation of the steel ball on its own axis. However, the two cycles must be set in such a manner that the ratio of these two cycles does not provide an integral number.

Referring here in more detail to the above-mentioned drive and control operation. As shown in FIG. 3, the motor controller 13 is provided with a CPU 14. The CPU 14 generates an instruction relating to a drive control for the skew drive motor 9 at a predetermined timing in accordance with a program stored in a ROM 14a. Commencement and Stoppage of the drive control of the CPU 14 for the skew drive motor is instructed by a manipulating instruction supplied by a manipulating portion 14b. In FIG. 3, the CPU 14 is operated to instruct a function generator 15 to generate a sine wave having a frequency corresponding to the cycle of the variable speed component. The thus obtained signal is F/V converted by an F/V converter 16 to thereby obtain a voltage, and a constant speed rotation instruction voltage 17 corresponding to the above-mentioned constant rotation speed component is added to the thus obtained voltage. Then, the thus obtained sum is input to a servo amplifier 18. As a result of this, there can be obtained motor rotation in which the speed thereof varies in a sine wave manner.

Also, the skew drive shaft 7 can be reciprocated by the piston/cylinder mechanism formed by the flange portion 7a and cylinder 8b, and the reciprocating motion of the skew drive shaft 7 decides the pressing force of the butting portion 7c, which is formed in one end of the skew drive shaft 7 against the steel ball 3.

Next, description will be given below of an inspection procedure using the above-mentioned ball bearing inspection unit employed in the present embodiment.

At first, the inner ring 4b of the ball bearing 4 to be inspected is mounted onto one end of the spindle rotary shaft 1. Then, the pre-load slider 8 is moved to a predetermined position and, due to the movement of the pre-load slider 8 to a predetermined position, the pre-load ring 5 is butted against the outer ring 4a of the ball bearing 4 to be inspected. Due to such butting of the pre-load ring 5, a pre-load of a predetermined value is applied to the outer ring 4a of the ball bearing 4 to be inspected. In this state, there is present a slight gap between the steel balls 3 and the leading end of the butting portion 7c of the skew drive shaft 7.

Next, in the skew drive shaft 7, the butting portion 7c of the skew drive shaft 7 is butted against the steel balls 3 by the piston/cylinder mechanism formed by the flange portion 7a and cylinder 8b, so that the pressing force of the butting portion 7c with respect to the steel balls 3 can provide a predetermined value.

When the butting of the pre-load ring 5 as well as the butting of the butting portion 7c of the skew drive shaft 7 are completed, the spindle rotary shaft 1 is rotated by the rotation drive motor 34 (shown in FIG. 1) and thus the inner ring 4b is rotated with respect to the outer ring 4a. At the same time, by driving and controlling the skew drive motor 9 in the above-mentioned manner, the skew drive shaft 7 is rotated; in more particular, the rotation of the skew drive shaft 7 involves cyclic changes. As a result of the relative rotation of the inner ring 4b and the rotation of the skew drive shaft 7, in each of the steel balls 3, on the rotation of the steel ball 3 on its own axis, namely, on the axis B, due to the pre-load applied to the outer ring 4a, there is superimposed a variable rotation component which occurs around an axis C shown in FIG. 3, namely, an axis which is perpendicular to the rotation axis of the spindle rotary shaft 1 and passes not only through a point on the spindle rotary shaft 1 rotation axis but also through the center of each steel ball 3, while the variable rotation component varies in speed; that is, since the own rotation axis of each steel ball 3 is determined by superimposition or composition of the two elements, the own rotation axis is actually caused to vary synchronously with such two element composition, with the result that each steel ball 3 is caused to make a skew movement. Due to such addition of this skew movement, each time the steel ball 3 rotates on its own axis, the loci of the contact points of the steel ball 3 with the outer ring 4a and inner ring 4b are caused to shift little by little on the steel ball 3, so that the contact area of the steel ball 3 with the inner and outer rings 4b and 4a finally provides or covers almost the whole area of the surface of the steel ball 3. By the way, the degree of shift of the loci of the steel ball contact points is determined by a difference between the cycle of above-mentioned steel ball rotation on its own axis and the above-mentioned variable rotation component and, therefore, it can be set properly according to cases.

Next, in a state that the respective steel balls 3 are rotating around the spindle rotary shaft 1 with their skew movements involved, there are measured the physical quantities such as vibrations or sound pressures that are generated from the ball bearing 4 to be inspected. The vibrations generated from the ball bearing 4 to be inspected are measured by a vibration measuring device which is composed of a converter or the like disposed in direct contact with the outer ring 4a and, on the other hand, the sound pressures generated from the ball bearing 4 to be inspected are measured using a sound pressure measuring device composed of a microphone or the like which is held at a predetermined position. Based on such measurement results, it is checked whether the quality of the ball bearing 4 to be inspected is good or not.

As described above, since the contact area of the steel ball 3 with respect to the respective grooves of the inner and outer rings 4b and 4a provides almost the whole area of the steel ball surface, the above-mentioned measurement results including therein the measurement results of the contact conditions of almost the whole surface area of the steel ball 3 with respect to the respective grooves of the inner and outer rings 4b and 4a, which makes it possible to inspect the whole surface area of the steel ball 3 for the finishing precision, presence or absence of surface damage and the like. With the present embodiment, it is possible to improve greatly the inspection precision of the ball bearing 4 to be inspected which is necessary to obtain a sufficient quality guarantee.

Figure 4:
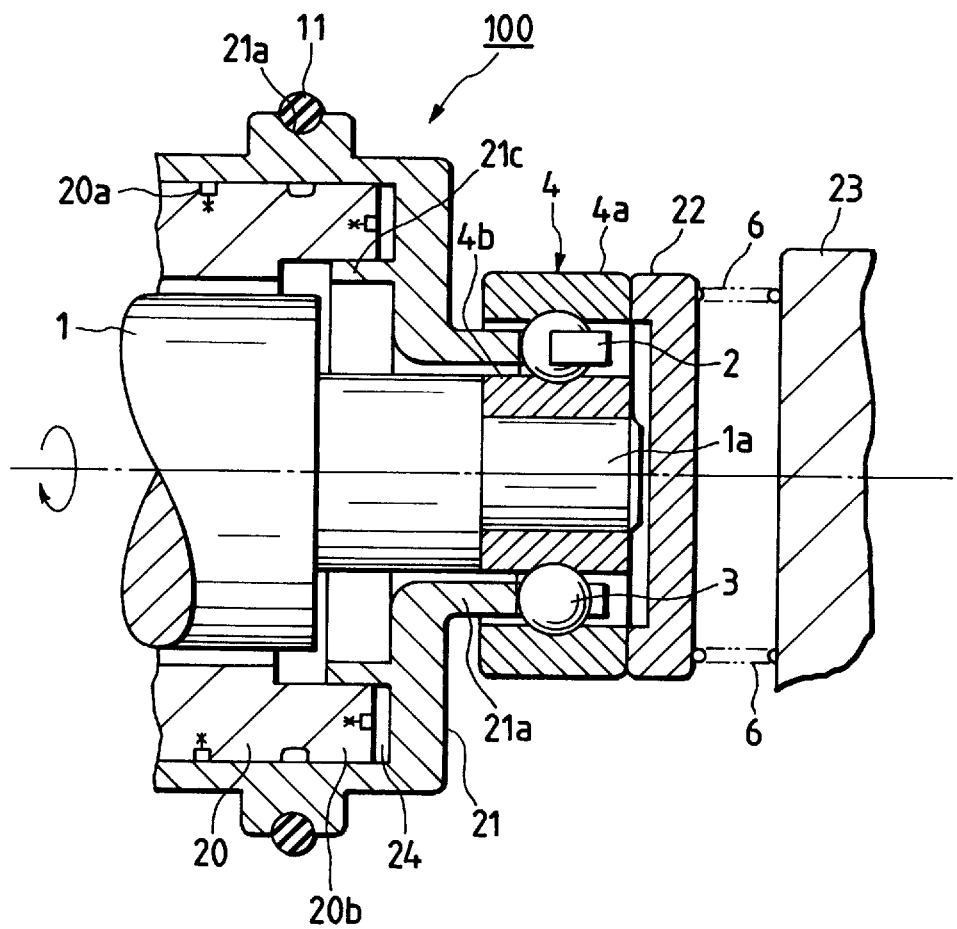
FIG. 4 is a structure view of the main portions of an inspection unit used in a second embodiment of a ball bearing inspection method according to the invention.

Next, description will be given below of a second embodiment of a ball bearing inspection method according to the invention with reference to FIG. 4. FIG. 4 is a structure view of the main portions of a ball bearing inspection unit which is used in the second embodiment of a ball bearing inspection method according to the invention.

The ball bearing inspection unit according to the second embodiment is different from the first embodiment in that a skew drive ring for driving a steel ball to make a skew movement is butted against the steel ball from the spindle rotary shaft side.

In particular, the ball bearing inspection unit according to the second embodiment, as shown in FIG. 4, comprises skew drive member 100 which is used to drive steel balls 3, which are respectively interposed between the respective grooves of inner and outer rings 4b and 4a, to make their respective skew movements, while the skew drive member 100 includes a skew drive ring 21 supported by a spindle 20 which is disposed coaxially with a spindle rotary shaft 1 and supports the spindle shaft 1. The skew drive ring 21 is structured such that the leading end portion thereof can be butted against the respective steel balls 3, while the skew drive ring 21 includes a small diameter portion 21a for receiving one end 1a of the spindle rotary shaft 1 and a large diameter portion 21b for receiving the spindle 20. The large diameter portion of the skew drive ring 21 is supported by an hair bearing 20a provided in the outer periphery portion of the spindle 20 in such a manner that it can be rotated and reciprocated, while the air bearing 20a is composed of an air entrance and a plurality of air escape grooves. On the outer peripheral portion of the large diameter portion 21b of the skew drive ring 21, there is disposed a pulley 21a formed integrally therewith, to which a drive force for rotating the skew drive ring 21 around the spindle rotary shaft 1 through a belt 11 is transmitted from a skew drive motor (not shown). In the inner wall of the large diameter portion of the skew drive ring 21, there is formed a protrusion portion 21c which cooperates with the inner wall so as to form a space for receiving the end portion 20b of the spindle 20; and, between the end portion 20b of the spindle 20 received in the thus formed space and the inner wall of the large diameter portion of the skew drive ring 21, there is defined a cylinder chamber 24 to which a pressurized air can be supplied. This cylinder chamber 24 cooperates with the skew drive ring 21 in forming a piston/cylinder mechanism and, by controlling the supply of the pressurized air to the cylinder chamber 24, the skew drive ring 21 can operate as a piston which reciprocates along the axis of the spindle rotary shaft 1.

The rotation speed of the skew drive ring 21, that is, the rotation speed of the skew drive motor which generates the drive force for driving the skew drive ring 21, similarly to the previously described first embodiment, is controlled such that it coincides with a speed obtained by superimposing a variable speed component, which varies in a wave form expressed by a sine function, on a constant rotation speed component.

Next, description will be given below of a ball bearing inspection method using the above-mentioned ball bearing inspection unit according to the second embodiment.

At first, the inner ring 4b of the ball bearing 4 to be inspected is mounted onto one end of the spindle rotary shaft 1. Then, the pre-load slider 23 is moved to a predetermined position and, due to the movement of the pre-load slider 23 to a predetermined position, the pre-load ring 22 is butted against the outer ring 4a of the ball bearing 4 to be inspected. Because of such butting of the pre-load ring 22, a pre-load of a predetermined value is applied to the outer ring 4a of the ball bearing 4 to be inspected. Also, by controlling the supply of the air to the cylinder chamber 24, the skew drive ring 21 is moved toward the steel balls 3, so that the leading end of the small diameter portion of the skew drive ring 21 is butted against the steel balls 3.

When the butting of the pre-load ring 22 as well as the butting of the leading end of the small diameter portion of the skew drive ring 21 are completed, the spindle rotary shaft 1 is rotated by the rotation drive motor and thus the inner ring 4b is rotated with respect to the outer ring 4a. At the same time, the skew drive ring 21 is rotated while it is controlled in such a manner that the rotation of the skew drive shaft 7 involves cyclic changes. As a result of the relative rotation of the inner ring 4b and the rotation of the skew drive ring 21, in each of the steel balls 3, on the rotation of the steel ball 3 on its own axis, namely, on the axis B, due to the pre-load applied to the outer ring 4a, there is superimposed a variable rotation component which occurs around an axis which is perpendicular to the rotation axis of the spindle rotary shaft 1 and also passes not only through a point on the spindle rotary shaft 1 rotation axis but also through the center of each steel ball 3, while the variable rotation component varies in speed, with the result that each steel ball 3 is caused to make a skew movement. Due to such addition of this skew movement, each time the steel ball 3 rotates on its own axis, the loci of the contact points of the steel ball 3 with respect to the outer ring 4a and inner ring 4b are caused to shift little by little on the steel ball 3, so that the contact area of the steel ball 3 with respect to the inner and outer rings 4b and 4a finally provides almost the whole area of the surface of the steel ball 3. By the way, the degree of shift of the loci of the steel ball contact points is determined by a difference between the cycle of above-mentioned steel ball rotation on its own axis and the above-mentioned variable rotation component and, therefore, it can be set properly according to cases.

Next, in a state that the respective steel balls 3 are rotating around the spindle rotary shaft 1 with their respective skew movements involved, there are measured vibrations or sound pressures that are generated from the ball bearing 4 to be inspected. Based on such measurement results, it is checked whether the quality of the ball bearing 4 to be inspected is good or not.

By the way, in the above-mentioned respective embodiments, the sine function is used as the variable speed component to be given to the skew drive shaft. However, this is not limitative but any other function can be used, provided that it is a function which varies cyclically.

As has been described heretofore, according to the ball bearing inspection apparatus and method of the invention, the butting portion formed in the rotary member rotatable coaxially with the reference rotary shaft is butted against the respective steel balls which are held between the respective grooves of the inner and outer rings of the ball bearing to be inspected, the reference rotary shaft is rotated with a pre-load applied to the outer ring, the rotary member is rotated while controlling the rotation speed thereof in such a manner that each of the steel balls, which rotates on its own axis and around the reference rotary shaft due to the rotation of the reference rotary shaft, is caused to make a skew movement by the butting portion, and the physical quantities generated from the ball bearing to be inspected are measured in a condition that each steel ball is making a skew movement in addition to the rotational movements on its own axis and around the reference rotary shaft. Because of this, in the measurement results, there are contained the measurement results of the contact conditions of almost the whole surface area of the steel ball with respect to the respective grooves of the inner and outer rings of the ball bearing to be inspected, which makes it possible to inspect the respective steel balls for their finishing precision and presence or absence of surface damage over the whole surface area thereof. Therefore, the inspection precision for obtaining a sufficient quality guarantee for the ball bearing to be inspected can be improved to a great extent.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

1. An inspection method for inspecting a ball bearing having an inner ring, an outer ring, and a plurality of rolling elements rotatably interposed between said inner ring and said outer ring, said inspection method comprising the steps of;

mounting said inner ring onto a reference rotary shaft rotatable on its own axis;

rotating said reference rotary shaft onto which said inner ring is thus mounted so as to rotate said inner ring relative to said outer ring and in turn rotate said rolling elements about its own axis and revolve said rolling elements about the rotating axis of said reference rotary shaft, while applying a pre-load to said outer ring in the axial direction thereof;

butting a butting portion formed in a rotary member which is rotatable coaxially with said reference rotary shaft against said rolling elements;

rotating said rotary member said butting portion of which is thus butt against said rolling elements so as to give said rolling elements skew movements respectively while controlling a rotation speed of said rotary member to be varied cyclically; and measuring physical quantities of said ball bearing generated from said ball bearing.

2. The inspection method according to claim 1, in which said reference rotary shaft rotating step, said rotary member rotating step, and said measuring physical quantities measuring step are simultaneously conducted.

3. The inspection method according to claim 1, in which said rotation speed of said rotary member is controlled to be varied cyclically in a sine wave.

4. The inspection method according to claim 3, in which the cycle of the variation of said rotation speed of said rotary member is set slightly larger or smaller than the cycle of the rotation of the rolling element about its own axis caused by the rotation of the reference rotary shaft.

5. An apparatus for inspecting a ball bearing having an inner ring, an outer ring, and a plurality of rolling elements rotatably interposed between said inner ring and said outer ring, said apparatus comprising:

a reference rotary shaft rotatable on its own axis, said inner ring being mounted on said reference rotary shaft;

a bearing rotating member for rotating said reference rotary shaft so as to rotate said inner ring relative to said outer ring and in turn rotate said rolling elements about its own axis and revolve said rolling elements about the rotating axis of said reference rotary shaft;

a pre-load applying member for applying a pre-load to said outer ring in the axial direction thereof;

a butting member for butting a butting portion formed in a rotary member which is rotatable coaxially with said reference rotary shaft against said rolling elements;

a skew controlling member for rotating said rotary member said butting portion of which is butted against said rolling elements so as to give said rolling elements skew movements respectively while controlling a rotation speed of said rotary member to be varied cyclically; and a measuring member for measuring physical quantities of said ball bearing generated from said ball bearing.

* * * * *